US012671076B2

(12) United States Patent
Lee et al.

(10) Patent No.: US 12,671,076 B2
(45) Date of Patent: Jun. 30, 2026

(54) METHOD FOR PREPARING POSITIVE ELECTRODE ACTIVE MATERIAL FOR SECONDARY BATTERY

(71) Applicant: LG Chem, Ltd., Seoul (KR)

(72) Inventors: Eun Hee Lee, Daejeon (KR); Seong Bae Kim, Daejeon (KR); Young Su Park, Daejeon (KR); Yi Rang Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1292 days.

(21) Appl. No.: 16/978,323

(22) PCT Filed: Jun. 7, 2019

(86) PCT No.: PCT/KR2019/006894
§ 371 (c)(1),
(2) Date: Sep. 4, 2020

(87) PCT Pub. No.: WO2019/235886
PCT Pub. Date: Dec. 12, 2019

(65) Prior Publication Data
US 2021/0005878 A1      Jan. 7, 2021

(30) Foreign Application Priority Data

Jun. 7, 2018     (KR) ........................ 10-2018-0065528

(51) Int. Cl.
H01M 4/13          (2010.01)
H01M 4/04          (2006.01)
(Continued)

(52) U.S. Cl.
CPC ......... H01M 4/131 (2013.01); H01M 4/0471 (2013.01); H01M 4/134 (2013.01);
(Continued)

(58) Field of Classification Search
None
See application file for complete search history.

(56) References Cited

U.S. PATENT DOCUMENTS

2012/0043500 A1     2/2012   Xiang et al.
2012/0045690 A1     2/2012   Xiang et al.
(Continued)

FOREIGN PATENT DOCUMENTS

CN          103151511 A      6/2013
CN          104347866 A      2/2015
(Continued)

OTHER PUBLICATIONS

International Search Report for Application No. PCT/KR2019/006894 dated Sep. 20, 2019.
(Continued)

*Primary Examiner* — Barbara L Gilliam
*Assistant Examiner* — Angela J Martin
(74) *Attorney, Agent, or Firm* — Lerner David LLP

(57) ABSTRACT

A method for preparing a positive electrode active material for a secondary battery includes the steps of: providing a positive electrode active material precursor including a core portion and a shell portion, wherein the core portion contains nickel (Ni), cobalt (Co), and manganese (Mn), and the shell portion contains cobalt (Co) and surrounds the core portion; and forming a lithium composite transition metal oxide in a single particle form by mixing the positive electrode active material precursor with a lithium raw material to obtain a mixture, and firing the mixture at a temperature of 970° C. or more.

13 Claims, 5 Drawing Sheets

EXAMPLE 1

LG Chem 10.0kV 4.6mm x5.00k SE                    10.0μm

(51) Int. Cl.

| | |
|---|---|
| *H01M 4/131* | (2010.01) |
| *H01M 4/134* | (2010.01) |
| *H01M 4/1391* | (2010.01) |
| *H01M 4/1395* | (2010.01) |
| *H01M 4/36* | (2006.01) |
| *H01M 4/50* | (2010.01) |
| *H01M 4/505* | (2010.01) |
| *H01M 4/52* | (2010.01) |
| *H01M 4/525* | (2010.01) |
| *H01M 10/05* | (2010.01) |
| *H01M 10/0525* | (2010.01) |
| *H01M 4/02* | (2006.01) |

(52) U.S. Cl.

CPC ....... *H01M 4/1391* (2013.01); *H01M 4/1395* (2013.01); *H01M 4/364* (2013.01); *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | | |
|---|---|---|---|---|
| 2013/0149608 A1* | 6/2013 | Kim | .................. | H01M 10/0525 |
| | | | | 429/223 |
| 2014/0205898 A1 | 7/2014 | Lee et al. | | |
| 2016/0190573 A1 | 6/2016 | Sun et al. | | |
| 2017/0301916 A1 | 10/2017 | Shin et al. | | |
| 2018/0013129 A1 | 1/2018 | Lee et al. | | |
| 2018/0212237 A1* | 7/2018 | Lee | .................. | H01M 10/0525 |

FOREIGN PATENT DOCUMENTS

| | | | |
|---|---|---|---|
| CN | 105431382 | A | 3/2016 |
| CN | 108028369 | A | 5/2018 |
| CN | 108123113 | A | 6/2018 |
| CN | 108793268 | A | 11/2018 |
| EP | 2602849 | A2 | 6/2013 |
| EP | 3291340 | A1 | 3/2018 |
| JP | 2006054159 | A | 2/2006 |
| JP | 2013012336 | A | 1/2013 |
| JP | 2013501316 | A | 1/2013 |
| JP | 2013120752 | A | 6/2013 |
| KR | 101396002 | B1 | 5/2014 |
| KR | 20140093529 | A | 7/2014 |
| KR | 20150016125 | A | 2/2015 |
| KR | 20150144886 | A | 12/2015 |
| KR | 101689212 | B1 | 12/2016 |
| KR | 101778243 | B1 | 9/2017 |
| KR | 20170103699 | A | 9/2017 |
| KR | 20180077090 | A | 7/2018 |
| KR | 20190058359 | A | 5/2019 |

OTHER PUBLICATIONS

Search Report dated Apr. 15, 2022 from the Office Action for Chinese Application No. 201980016023.2 issued Apr. 21, 2022, pp. 1-3. [See p. 2, categorizing the cited references].

Extended European Search Report including Written Opinion for Application No. 19814255.6 dated Mar. 17, 2021, 8 pages.

* cited by examiner

METHOD FOR PREPARING POSITIVE ELECTRODE ACTIVE MATERIAL FOR SECONDARY BATTERY

TECHNICAL FIELD

Cross-Reference to Related Applications

The present application is a national phase entry under 35 U.S.C. § 371 of International Application No. PCT/KR2019/006894 filed Jun. 7, 2019, which claims priority from Korean Patent Application No. 10-2018-0065528 filed Jun. 7, 2018, all of which are incorporated herein by reference.

TECHNICAL FIELD

The present invention relates to a method for preparing a positive electrode active material for a secondary battery.

BACKGROUND ART

In recent years, with the rapid spread of electronic devices using batteries, such as mobile phones, laptop computers, electric vehicles, and the like, the demand for secondary batteries having small size, light weight, and relatively high capacity has been rapidly increased.

The lithium secondary battery generates electric energy by oxidation and reduction reaction when lithium ions are intercalated into and deintercalated from a positive electrode and a negative electrode in a state in which an organic electrolyte or a polymer electrolyte is filled between the positive electrode and the negative electrode, which are made of an active material capable of intercalating and deintercalating lithium ions.

As a positive electrode active material of lithium secondary batteries, lithium cobalt oxide ($LiCoO_2$), lithium nickel oxide ($LiNiO_2$), lithium manganese oxide ($LiMnO_2$ or $LiMn_2O_4$), lithium iron phosphate compound ($LiFePO_4$), and the like were used. Among these, lithium cobalt oxide ($LiCoO_2$) is widely used because of having an advantage of high operating voltage and excellent capacity characteristics, and is employed as positive electrode active materials for a high voltage. However, there is a limitation in mass-use as a power source in fields such as electric vehicles due to rising prices and unstable supply of cobalt (Co). Thus, the need for development of positive electrode active materials that can overcome such a limitation emerges.

Accordingly, a nickel-cobalt-manganese-based lithium composite transition metal oxide (hereinafter, simply referred to as 'NCM-based lithium composite transition metal oxide') in which a part of Co is substituted with nickel (Ni) and manganese (Mn) is developed. However, NCM-based lithium composite transition metal oxide conventionally developed in the form of secondary particles in which primary particles are aggregated has limitations of large specific surface area, low particle strength, a large amount of generation of gas in operating a cell and less stability due to the high content of lithium by-products. In other words, NCM-based lithium composite transition metal oxide conventionally developed is limited in use for a high voltage battery because the stability thereof is not ensured. Therefore, it is still required to develop NCM-based lithium composite transition metal oxide-containing positive electrode active materials applicable to high voltage lithium secondary batteries.

DISCLOSURE OF THE INVENTION

Technical Problem

The present invention relates to a method for preparing an NCM-based lithium composite transition metal oxide-containing positive electrode active material applicable to high voltage lithium secondary batteries. In particular, the present invention provides a method for preparing an NCM-based lithium composite transition metal oxide-containing positive electrode active material which may reduce a specific surface area, improve a particle strength, decrease an amount of generation of gas in operating a cell by reducing a lithium by-products content.

Furthermore, there is a limitation such as difficulty in disintegration because of a strong cohesion between the particles when a positive electrode material in the form of single particles is prepared by firing at high temperature. The present invention provides a method for preparing a positive electrode active material that can overcome such a limitation.

Technical Solution

The present invention provides a method for preparing a positive electrode active material for a secondary battery which includes: providing a positive electrode active material precursor including a core portion and a shell portion, wherein the core portion contains nickel (Ni), cobalt (Co), and manganese (Mn), and the shell portion contains cobalt (Co) and surrounds the core portion; forming a lithium composite transition metal oxide in a single particle form by mixing the positive electrode active material precursor with a lithium raw material to obtain a mixture, and firing the mixture at a temperature of 970° C. or more.

Advantageous Effects

An NCM-based positive electrode active material prepared in accordance with the present invention may reduce a specific surface area, improve particle strength, decrease the amount of generation of gas in operating a cell by reducing a lithium by-products content. The NCM-based positive electrode active material in accordance with the present invention may secure excellent stability and thus be applied to high voltage lithium secondary batteries.

Further, according to the present invention, it is possible to easily prepare an NCM-based positive electrode active material in the form of single particles by firing only once, the degree of disintegration of particles may be improved in spite of the particles in form of single particles prepared by firing at high temperature and thus productivity and the ease of processing may be improved.

MODE FOR CARRYING OUT THE INVENTION

Figure 1:
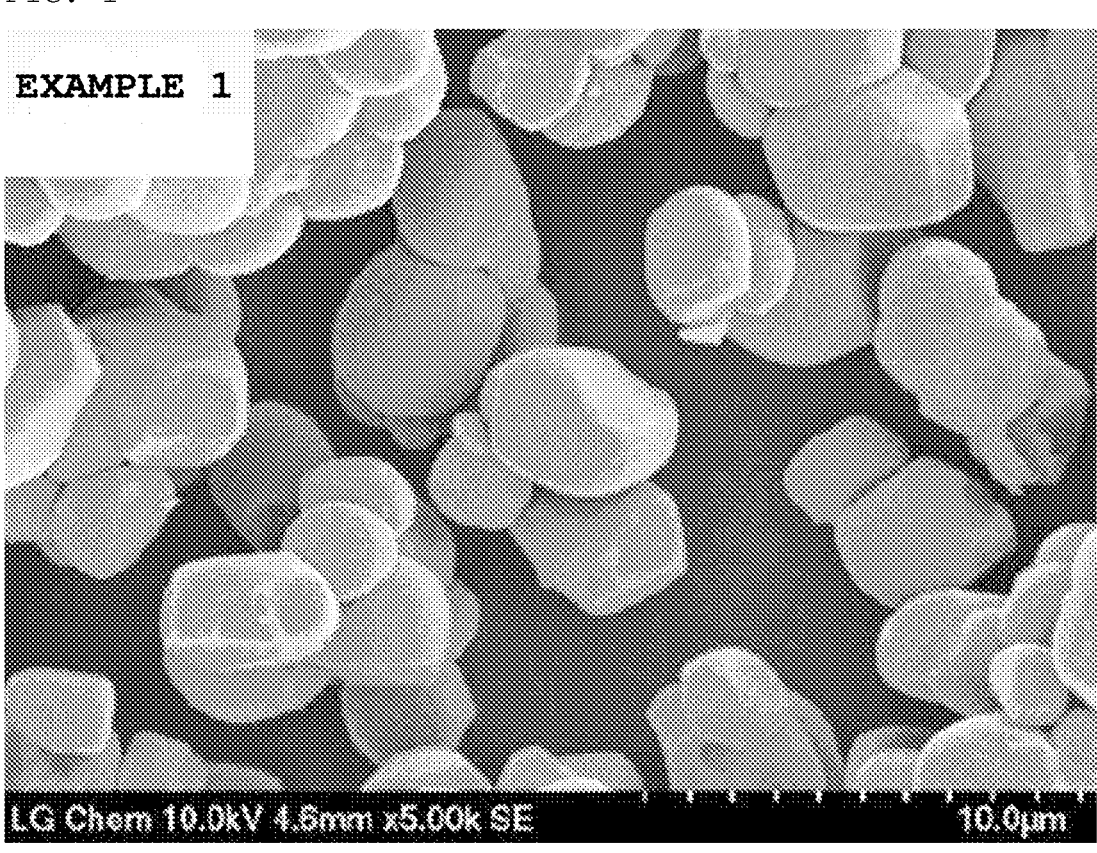
FIGS. 1 to 4 are scanning electron microscope (SEM) photographs (enlarged for observation) showing the positive electrode active materials prepared in Example 1 and Comparative Example 1 after being disintegrated.

Hereinafter, the present invention will be described in more detail to allow for a clearer understanding of the present invention. Here, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

<Method for Preparing Positive Electrode Active Material>

A method for preparing a positive electrode active material for a secondary battery of the present invention comprises: providing a positive electrode active material precursor including a core portion and a shell portion, wherein the core portion contains nickel (Ni), cobalt (Co), and manganese (Mn), and the shell portion contains cobalt (Co) and surrounds the core portion; and forming a lithium composite transition metal oxide in a single particle form by mixing the positive electrode active material precursor with a lithium raw material to obtain a mixture, and firing the mixture at a temperature of 970° C. or more.

The method for preparing a positive electrode active material will be described in detail step by step.

First of all, a positive electrode active material precursor including a core portion and a shell portion, wherein the core portion contains nickel (Ni), cobalt (Co), and manganese (Mn), and the shell portion contains cobalt (Co) and surrounds the core portion is provided.

The core portion may be formed by coprecipitating a first transition metal solution including nickel (Ni), cobalt (Co), and manganese (Mn), and the shell portion may be formed by coprecipitating a second transition metal solution including cobalt (Co).

More particularly, the core portion of the precursor may be produced by coprecipitation reaction by adding an ammonium cation-containing complexing agent and a basic compound to a first transition metal solution having a nickel-containing raw material, a cobalt-containing raw material and a manganese-containing raw material.

The nickel-containing raw material may be, for example, nickel-containing acetic acid salt, nitrate, sulphate, halide, sulfide, hydroxide, oxide or oxyhydroxide or the like, and specifically, may be $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salt, nickel halide or a combination thereof, but is not limited thereto.

The cobalt-containing raw material may be, for example, cobalt-containing acetic acid salt, nitrate, sulphate, halide, sulfide, hydroxide, oxide or oxyhydroxide or the like, and specifically, may be $Co(OH)_2$, $CoOOH$, $Co(OCOCH_3)_2 \cdot 4H_2O$, $Co(NO_3)_2 \cdot 6H_2O$, $CoSO_4$, $Co(SO_4)_2 \cdot 7H_2O$ or a combination thereof, but is not limited thereto.

The manganese-containing raw material may be, for example, manganese-containing acetic acid salt, nitrate, sulphate, halide, sulfide, hydroxide, oxide, oxyhydroxide or a combination thereof, and specifically, may be manganese oxides such as $Mn_2O_3$, $MnO_2$, and $Mn_3O_4$; manganese salt such as $MnCO_3$, $Mn(NO_3)_2$, $MnSO_4$, manganese acetate, dicarboxylic acid manganese salt, manganese citrate, and fatty acid manganese salt; manganese oxyhydroxide, manganese chloride or a combination thereof, but is not limited thereto.

The first transition metal solution may be produced by adding a nickel-containing raw material, a cobalt-containing raw material and a manganese-containing raw material to a solvent, which is specifically water, or a mixed solvent of water and an organic solvent which can be uniformly mixed with water (e.g., alcohol and the like), or mixing an aqueous solution of a nickel-containing raw material, an aqueous solution of a cobalt-containing raw material and an aqueous solution of a manganese-containing raw material.

The ammonium cation-containing complexing agent may be, for example, $NH_4OH$, $(NH_4)_2SO_4$, $NH_4NO_3$, $NH_4Cl$, $CH_3COONH_4$, $NH_4CO_3$ or a combination thereof, but is not limited thereto. On the other hand, the ammonium cation-containing complexing agent may be used in the form of an aqueous solution, and here, water, or a mixture of water and an organic solvent which can be uniformly mixed with water (specifically, alcohol and the like) may be used as a solvent.

The basic compound may be a hydroxide of an alkali metal or an alkaline earth metal such as NaOH, KOH or $Ca(OH)_2$, a hydrate thereof, or a combination thereof. The basic compound may also be used in the form of an aqueous solution, and here, water, or a mixture of water and an organic solvent which can be uniformly mixed with water (specifically, alcohol and the like) may be used as the solvent.

The basic compound is added to adjust the pH of a reaction solution, and may be added in an amount such that the pH of a metal solution becomes 10-12.5.

On the other hand, the coprecipitation reaction may be carried out under an inert atmosphere such as nitrogen or argon or the like, at a temperature of 40-70° C.

By the process described above, nickel-cobalt-manganese hydroxide particles are produced and precipitated in the reaction solution.

Thereafter, in order to form the shell portion surrounding the core portion, a coprecipitation reaction may be performed by adding a second transition metal solution having a cobalt-containing raw material, an ammonium cation-containing complexing agent, a basic compound to the nickel-cobalt-manganese hydroxide.

The cobalt-containing raw material may be, for example, cobalt-containing acetic acid salt, nitrate, sulphate, halide, sulfide, hydroxide, oxide or oxyhydroxide or the like, and specifically, may be $Co(OH)_2$, $CoOOH$, $Co(OCOCH_3)_2 \cdot 4H_2O$, $Co(NO_3)_2 \cdot 6H_2O$, $CoSO_4$, $Co(SO_4)_2 \cdot 7H_2O$ or a combination thereof, but is not limited thereto.

The second transition metal solution may be produced by adding a cobalt-containing raw material to a solvent, which is specifically water, or a mixed solvent of water and an organic solvent which can be uniformly mixed with water (e.g., alcohol and the like).

Descriptions for the ammonium cation-containing complexing agent and the basic compound are the same as those given in the formation of the core portion, and will thus be omitted.

The basic compound in the forming of the shell portion may be added in an amount such that the pH of a metal solution becomes 10-12.5.

On the other hand, the coprecipitation reaction in the forming of the shell portion may be carried out under an inert atmosphere such as nitrogen or argon or the like, at a temperature of 40-70° C.

By the process described above, particles including the core portion of nickel-cobalt-manganese hydroxide and the shell portion of the cobalt hydroxide are produced and precipitated in the reaction solution. A positive electrode active material precursor may be obtained by separating and drying the precipitated particles by a conventional method.

The positive electrode active material precursor produced thus forms a core-shell structure including the core portion and the shell portion, wherein the core portion contains nickel (Ni), cobalt (Co), and manganese (Mn), and the shell portion contains cobalt (Co).

In a case of conventional particles in the form of single particles which are prepared by firing at the high temperature, there is a problem such as difficulty in disintegration because of a strong cohesion between the particles. The present invention may improve the degree of disintegration to improve the ease of processing, since particles in the form of single particles are prepared by using a positive electrode active material of a core-shell structure formed of the shell portion containing cobalt (Co) on the core portion. In other words, according to the present invention, the range of available crushing machines may be widened, and improve productivity in spite of the particles in the form of single particles prepared by firing at a high temperature. In addition, a lithium by-products content may be further reduced.

Here, the shell portion may be formed to have 5 to 30 parts by volume based on 100 parts by volume of the positive electrode active material precursor. More preferably, the shell portion may be formed to have 5 to 20 parts by volume, further preferably, 5 to 15 parts by volume. In the formation of the shell portion, by controlling a concentration of the second transition metal solution and a coprecipitation time of the coprecipitation reaction, the shell portion may be prepared to have a weight ratio within the above range. By forming such that the shell portion has a weight ratio within the above range, the effect of reducing the lithium by-product content and improving the degree of disintegration may be implemented.

On the other hand, the positive electrode active material precursor may be prepared to have a composition including a nickel (Ni) content of 60 mol % or less in the total transition metal, and a cobalt (Co) content greater than a manganese (Mn) content. Here, the composition may be based on a total composition of a precursor including the core portion/the shell portion. In the preparing the precursor, by controlling concentrations of a nickel-containing raw material, a cobalt-containing raw material and a manganese-containing raw material, and a coprecipitation time of the core portion/the shell portion, the precursor may be prepared to have the above-mentioned composition. More preferably, a nickel (Ni) content may be 55 mol % or less, further preferably, 50 mol % or less. In addition, more preferably, a cobalt (Co) content may be at least 5 mol % greater than a manganese (Mn) content, further preferably, at least 10 mol % greater than a manganese (Mn) content. If a positive electrode active material satisfying the above composition is used, an NCM-based positive electrode active material in the form of single particles may be formed easily by firing only once at a temperature of 970° C. or more.

The positive electrode active material precursor prepared in the same manner as described above is in the form of secondary particles in which primary particles are aggregated, and the secondary particles of the precursor may have an average particle diameter ($D_{50}$) of 3-8 μm, more preferably 3-7 μm, further preferably 3-6 μm. In the present invention, a 'primary particle' refers to a primary structure body of a single particle, and a 'secondary particle' refers to an aggregate agglomerated between primary particles by physical or chemical bonding thereof without intentional agglomeration or assembly process for primary particles constituting a secondary particle, that is to say a secondary structure body.

Next, the positive electrode active material precursor and a lithium raw material are mixed, and the resulting mixture is fired at a temperature of 970° C. or more to form a lithium composite transition metal oxide in the form of single particles. The NCM-based positive electrode active material in the form of single particles prepared thus may allow a specific surface area to be reduced, a particle strength to be improved, an amount of generation of gas in operating a cell to be decreased by reducing a lithium by-products content. In addition, the NCM-based positive electrode active material prepared in accordance with the present invention may secure excellent stability and thus be applied to high voltage lithium secondary batteries.

As the lithium raw material, a lithium-containing sulfate, nitrate, acetate, carbonate, oxalate, citrate, halide, hydroxide or oxyhydroxide or the like may be used, and the lithium raw material is not particularly limited as long as it can be dissolved in water. Specifically, the lithium source may be $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$ or the like, and any one or a mixture of two or more of them may be used.

the lithium raw material may be mixed so that a molar ratio (Li/M) of lithium (Li) in the lithium raw material to all metal elements (M) contained in the lithium composite transition metal oxide is 1.06 or less. More preferably, the lithium raw material may be mixed such that Li/M is 1-1.05, further preferably 1-1.04. When Li/M satisfies the range, a lithium composite transition metal oxide which is in the form of single particles and has a lamellar crystal structure expressed by a space group of R3M may be formed.

By mixing the positive electrode active material with a lithium raw material and firing the resulting mixture at a temperature of 970° C. or more, a NCM-based positive electrode active material in the form of single particles may be formed easily by firing only once. In other words, while the precursor was a secondary particle form, in case of the firing under specific condition using the precursor according to the present invention, the NCM-based positive electrode active material which is in the form of single particles and has an average particle diameter ($D_{50}$) of the primary particles from 2 μm to 10 μm may be prepared by the firing process. Also, previously, there is a problem such as difficulty in disintegration when a positive electrode material is prepared by firing at a high temperature, and the present invention may improve the degree of disintegration of the positive electrode material which is in the form of single particles and prepared by employing the precursor of the core-shell structure including the shell portion containing cobalt (Co) in the same manner as described above. On the other hand, in order to prepare the single particle-type NCM-based positive electrode active material, because the composition including the concentration gradient of nickel (Ni), cobalt (Co), manganese (Mn) becomes equilibrium, the cobalt (Co) shell portion of precursor disappears by undergoing the firing process at a temperature of 970° C. or more, and thus the finally prepared positive electrode active material of the lithium composite transition metal oxide may not be the core-shell structure.

The firing temperature may preferably be 970° C. or more to form a single particle, more preferably 980-1050° C., further preferably 980-1020° C. If the firing temperature is less than 970° C., the preparation of the single particle-type NCM-based positive electrode active material may be difficult, and the NCM-based positive electrode active material in the form of an agglomerated secondary particle may be prepared.

The firing may be carried out under an atmosphere of air or oxygen, and progressed for 5-13 hours.

The firing may be carried out such that the primary particles of the prepared single particle-type NCM-based positive electrode active material has an average particle diameter ($D_{50}$) of primary particles from 2 μm to 10 μm. More preferably, the firing may be carried out such that the primary particles has an average particle diameter ($D_{50}$) of 3-9 μm, further preferably 4-8 μm. In case of a single particle-type positive electrode active material having the average particle diameter ($D_{50}$) of the primary particles, a particle strength may be increased to suppress the particle cracking during rolling work, the rolling density may be improved, a specific surface area is reduced, an amount of generation of gas by side reaction with an electrolyte may be decreased because the lithium by-product is reduced.

In the present invention, an average particle diameter ($D_{50}$) may be derived as a particle diameter corresponding to 50% of the volume accumulation amount in the particle diameter distribution curve. The average particle diameter ($D_{50}$) may be measured using, for example, a laser diffraction method. For example, a method for measuring the average particle diameter ($D_{50}$) of the positive electrode active material may be prepared by dispersing positive electrode active material particles in a dispersion medium, introducing the dispersed positive electrode active material particles in a commercially available laser diffraction particle size measuring apparatus (for example, Microtrac MT 3000), irradiating the dispersed positive electrode active material particles with ultrasonic waves of about 28 kHz with an output of 40 W, and computing the average particle diameter ($D_{50}$) corresponding to 50% of the volume accumulation in a measuring apparatus.

In addition, the firing may be performed such that the single particle-type NCM-based positive electrode active material has a crystallite size of 210 nm or more. More preferably, the firing may be performed such that the single particle-type NCM-based positive electrode active material has the crystallite size of 215 nm or more, further preferably 220 nm or more. The positive electrode active material satisfying the crystallite size according to an embodiment of the present invention may suppress the particle cracking by rolling work, and improve life characteristics and stability.

In the present invention, a 'particle' means a granule in a unit of micrometer, and when observing the particle on an enlarged scale, a 'grain' having a crystal shape of several tens of nanometers may be distinguished. If observing the particle on further enlarged scale, a divided area where atoms form a lattice structure in a certain direction may be seen, and the divided area is called a 'crystallite'. The particle size observed through an XRD is defined as a crystallite size. A method for measuring the crystallite size may estimate the crystallite size by using the peak broadening of XRD data, and calculate the crystallite size quantitatively from the Scherrer equation.

Next, a coating portion may be formed by optionally mixing the lithium composite transition metal oxide with a coating raw material including at least one selected from the group consisting of Al, B, Zr, Ti, Mg, Ta, Nb, Mo, W and Cr, and heat-treating the mixture. The coating raw material may more preferably include Al, B and/or W, further preferably include Al. In case of the coating raw material, for example, $Al(OH)_3$, $Al_2O_3$, $AlPO_4$, $AlCl_3$, $Al_2(SO_4)_3$ and the like may be employed.

The heat-treating may be performed at a temperature of 300-700° C., more preferably 400-600° C. The heat-treating may be performed for 1-6 hours.

By further forming the coating portion, the lithium by-products on a particle surface is reduced, and an amount of generation of gas in operating a cell may be further decreased.

<Positive Electrode and Secondary Battery>

A positive electrode for lithium secondary batteries and a lithium secondary battery may be manufactured by using the positive electrode active material prepared in accordance with one embodiment of the present invention.

Specifically, the positive electrode includes a positive electrode current collector, and a positive electrode active material layer formed on the positive electrode current collector and including the positive electrode active material.

In the positive electrode, the positive electrode current collector is not particularly limited as long as it has conductivity without causing chemical changes in the battery, and, for example, stainless steel, aluminum, nickel, titanium, fired carbon, or aluminum or stainless steel that is surface-treated with carbon, nickel, titanium, silver, or the like may be used. Also, the positive electrode current collector may typically have a thickness of 3-500 μm, and microscopic irregularities may be formed on the surface of the positive electrode current collector to improve the adhesion of the positive electrode active material. For example, various shapes such as those of a film, a sheet, a foil, a net, a porous body, a foam body, a non-woven fabric body, and the like may be used.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has electron conductivity without causing chemical changes in the constituted battery. Specific examples of the conductive agent may be graphite such as natural graphite or artificial graphite or the like; carbon based material such as carbon black, acetylene black, Ketjen black, channel black, furnace black, lamp black, thermal black, and carbon fibers, and the like; powders or fibers of metal such as copper, nickel, aluminum, and silver, and the like; conductive whiskers such as zinc oxide whiskers and potassium titanate whiskers, and the like; conductive metal oxides such as titanium oxide, and the like; or conductive polymers such as polyphenylene derivatives and the like, and one thereof or a mixture of two or more thereof may be used. The conductive agent may be typically included in an amount of 1-30 wt % based on a total weight of the positive electrode active material layer.

Furthermore, the binder improves the adhesion between the positive electrode active material particles and the adhesion between the positive electrode active material and the positive electrode current collector. Specific examples of the binder may be polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber (SBR), a fluorine rubber, or various copolymers thereof, and one thereof or a mixture of two or more thereof may be used. The binder may be included in an amount of 1-30 wt % based on the total weight of the positive electrode active material layer.

The positive electrode may be manufactured according to a typical method of preparing a positive electrode except that the above-described positive electrode active material is used. Specifically, a composition for forming a positive electrode active material layer including the above-described positive electrode active material and selectively the binder and the conductive agent is coated on the positive electrode current collector, and the positive electrode may then be prepared by drying and rolling the coated positive electrode current collector. In this case, types and amounts of the positive electrode active material, the binder, and the conductive agent are the same as those previously described.

The solvent may be a solvent normally used in the art. The solvent may include dimethyl sulfoxide (DMSO), isopropyl alcohol, N-methylpyrrolidone (NMP), acetone, or water, and one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode current collector.

According to another embodiment of the present invention, an electrochemical device including the positive electrode is provided. The electrochemical device may specifically be a battery or a capacitor, and, more specifically, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is the same as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode current collector, and a negative electrode active material layer disposed on the negative electrode current collector.

The negative electrode current collector is not particularly limited as long as it has high conductivity without causing chemical changes in the battery, and, for example, copper, stainless steel, aluminum, nickel, titanium, fired carbon, copper or stainless steel that is surface-treated with carbon, nickel, titanium, silver, or the like, and an aluminum-cadmium alloy may be used. Also, the negative electrode current collector may typically have a thickness of 3-500 µm, and, similar to the positive electrode current collector, microscopic irregularities may be formed on the surface of the collector to improve the adhesion of a negative electrode active material. For example, various shapes such as that of a film, a sheet, a foil, a net, a porous body, a foam body, a non-woven fabric body, and the like may be used.

The negative electrode active material layer selectively includes a binder and a conductive agent in addition to the negative electrode active material. The negative electrode active material layer may be prepared, as an embodiment, by coating a composition for forming a negative electrode, which selectively includes the binder and the conductive agent as well as the negative electrode active material, on the negative electrode current collector and drying the coated negative electrode current collector, or may be prepared by casting the composition for forming a negative electrode on a separate support and then laminating a film separated from the support on the negative electrode current collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon, and the like; a metallic compound alloyable with lithium such as Si, Al, Sn, Pb, Zn, Bi, In, Mg, Ga, Cd, a Si alloy, a Sn alloy, or an Al alloy, or the like; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes or the like.

Also, the binder and the conductive agent may be the same as those previously described in the positive electrode.

Meanwhile, in the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be desirable. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, and the like, or a laminated structure having two or more layers thereof may be used. Also, a typical porous non-woven fabric, for example, a non-woven fabric formed of high melting-point glass fibers or polyethylene terephthalate fibers, or the like may be used. Furthermore, a coated separator including a ceramic component or a polymer material may be used to secure heat resistance or mechanical strength, and the separator having a single layer or multi-layer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte, or the like which may be used in the preparation of the lithium secondary battery, but is not limited thereto.

Specifically, the electrolyte may include an organic solvent and a lithium salt.

Any organic solvent may be used as the organic solvent without a particular limitation so long as it may function as a medium through which ions involved in an electrochemical reaction of the battery may move. Specifically, as the organic solvent, an ester-based solvent such as methyl acetate, ethyl acetate, γ-butyrolactone, and ε-caprolactone, and the like; an ether-based solvent such as dibutyl ether or tetrahydrofuran, or the like; a ketone-based solvent such as cyclohexanone and the like; an aromatic hydrocarbon-based solvent such as benzene and fluorobenzene, and the like; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC), and the like; an alcohol-based solvent such as ethyl alcohol and isopropyl alcohol, and the like; nitriles such as R—CN (where R is a linear, branched, or cyclic C2-C20 hydrocarbon group and may include a double-bond aromatic ring or ether bond); amides such as dimethylformamide and the like; dioxolanes such as 1,3-dioxolane and the like; or sulfolanes may be used. Among these solvents, the carbonate-based solvent may be desirable, and a mixture of a cyclic carbonate (e.g., ethylene carbonate or propylene carbonate, or the like) having high ionic conductivity and high dielectric constant, which may increase charge and discharge performance of the battery, and a low-viscosity linear carbonate-based compound (e.g., ethylmethyl carbonate, dimethyl carbonate, or diethyl carbonate, or the like) may be further desirable. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$, or the like may be used as the lithium salt. The lithium salt may be used in a concentration range of 0.1-2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, or the like, may be further added to the electrolyte in addition to the electrolyte components. In this case, the additive may be included in an amount of 0.1-5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for fields of portable devices, such as mobile phones, laptop computers, and digital cameras, and the like, and electric cars, such as hybrid electric vehicles (HEV) and the like, and so on.

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a batch-type 40 L reactor set at 50° C., a first transition metal solution having a concentration of 2.4 M was prepared by mixing $NiSO_4$, $CoSO_4$, and $MnSO_4$ in water in amounts such that the molar ratio of nickel:cobalt:manganese becomes 57:20:23.

13 liters of deionized water was added to the coprecipitation reactor (capacity: 40 L), and nitrogen gas was purged into the reactor at a rate of 25 liters/minute to remove dissolved oxygen in the water and create a non-oxidizing atmosphere in the reactor. Thereafter, 83 g of a NaOH aqueous solution having a concentration of 25% was added thereto, and the mixture was stirred at a temperature of 50° C. and a stirring speed of 700 rpm to keep the pH of 11.5.

Thereafter, the first transition metal solution was separately input at a rate of 1.9 L/hr, and NaOH aqueous solution, $NH_4OH$ aqueous solution were added therewith, and at the same time, the coprecipitation reaction was performed for 41.8 hours to produce the core portion of nickel-cobalt-manganese hydroxide.

Thereafter, the second transition metal solution having a concentration of 2.2 M was prepared by mixing $CoSO_4$ in water. The second transition metal solution was input at a rate of 1.9 L/hr, and NaOH aqueous solution, $NH_4OH$ aqueous solution were added therewith, and at the same time, the coprecipitation reaction was performed for 6.2 hours to produce the shell portion.

The hydroxide particles were separated and washed, and then dried in an oven at 120° C. for 12 hours to prepare a positive electrode active material. The positive electrode active material precursor prepared in the same as described above had core-shell structure and formed the particles of nickel-cobalt-manganese-containing hydroxide having a total composition of $Ni_{0.5}Co_{0.3}Mn_{0.2}(OH)_2$.

The positive electrode active material precursor prepared in the same as described above and lithium source $Li_2CO_3$ were input in a Henschel mixer (20 L) such that a molar ratio of Li/M (Ni, Co, Mn) becomes 1.02, and then mixed at a 300 rpm which was rpm of a central portion for 20 minutes. The mixed powder was input in a alumina crucible having the size of 330 mm×330 mm, and fired under an atmosphere of air at 990° C. for 21 hours to prepare the positive electrode active material of the lithium composite transition metal oxide.

Example 2

The lithium composite transition metal oxide prepared in the same as Example 1 and $Al_2O_3$ were mixed. The mixed mixture was treated heat under an atmosphere of air at 500° C. for 3 hours to prepare the positive electrode active material formed Al coating portion.

Comparative Example 1

In a batch-type 40 L reactor set at 50° C., a precursor forming solution was prepared by mixing $NiSO_4$, $CoSO_4$, and $MnSO_4$ in water in amounts such that the molar ratio of nickel:cobalt:manganese becomes 50:30:20.

13 liters of deionized water was added to the coprecipitation reactor (capacity: 40 L), and nitrogen gas was purged into the reactor at a rate of 25 liters/minute to remove dissolved oxygen in the water and create a non-oxidizing atmosphere in the reactor. Thereafter, 83 g of a NaOH aqueous solution having a concentration of 25% was added thereto, and the mixture was stirred at a temperature of 50° C. and a stirring speed of 700 rpm to keep the pH of 11.5.

Thereafter, the precursor forming solution was separately input at a rate of 1.9 L/hr, and NaOH aqueous solution, $NH_4OH$ aqueous solution were added therewith, and at the same time, the coprecipitation reaction was performed for hours to produce particles of nickel-cobalt-manganese-containing hydroxide $(Ni_{0.5}Co_{0.3}Mn_{0.2}(OH)_2)$. The hydroxide particles were separated and washed, and then dried in an oven at 120° C. to prepare a positive electrode active material.

The positive electrode active material precursor prepared in the same as described above and lithium source $Li_2CO_3$ were input in a Henschel mixer (20 L) such that a molar ratio of Li/M (Ni, Co, Mn) becomes 1.02, and then mixed at a 300 rpm which was rpm of a central portion for 20 minutes. The mixed powder was input in a alumina crucible having the size of 330 mm×330 mm, and fired under an atmosphere of air at 990° C. for 21 hours to prepare the positive electrode active material of the lithium composite transition metal oxide.

Figure 2:
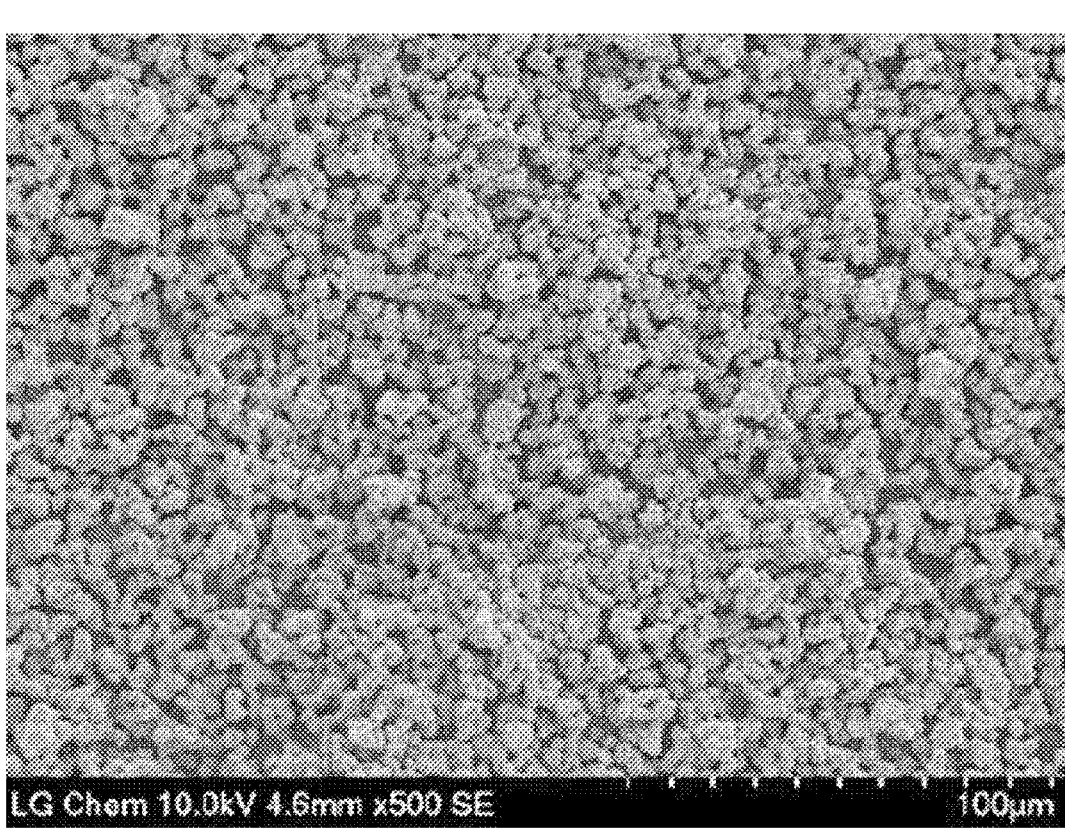
Figure 3:
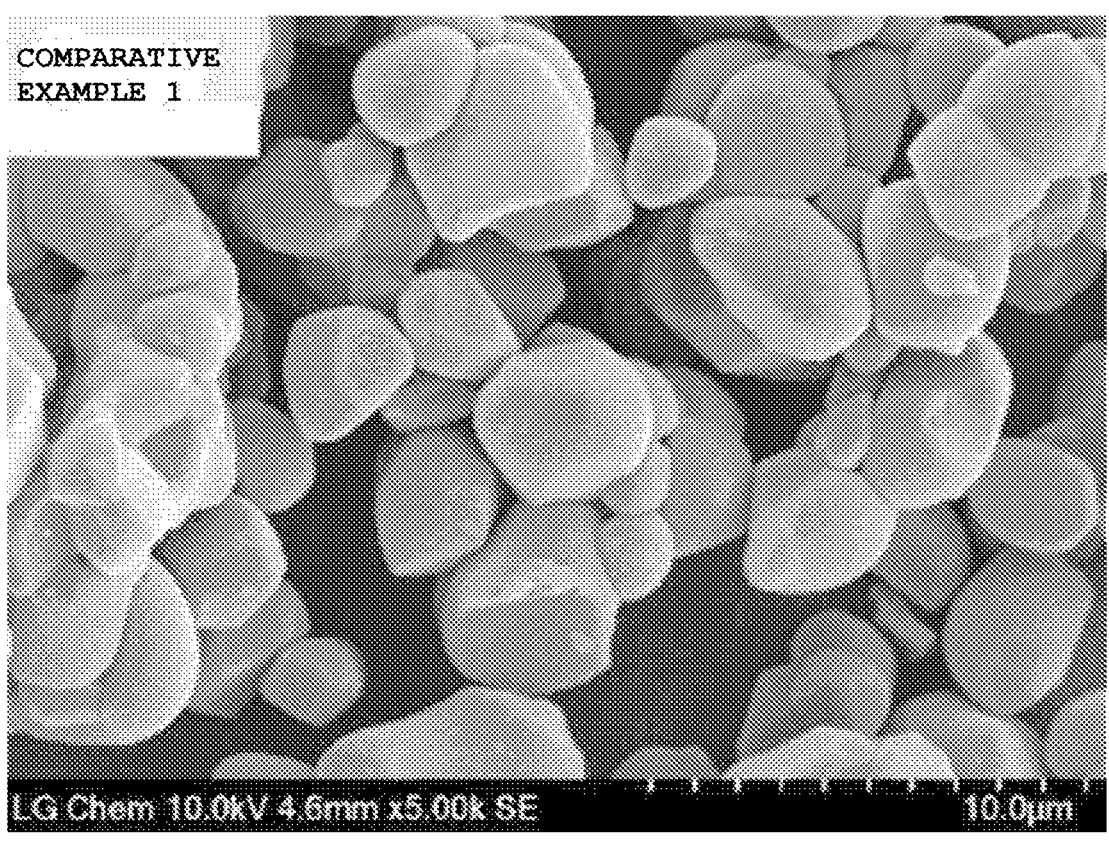
Figure 4:
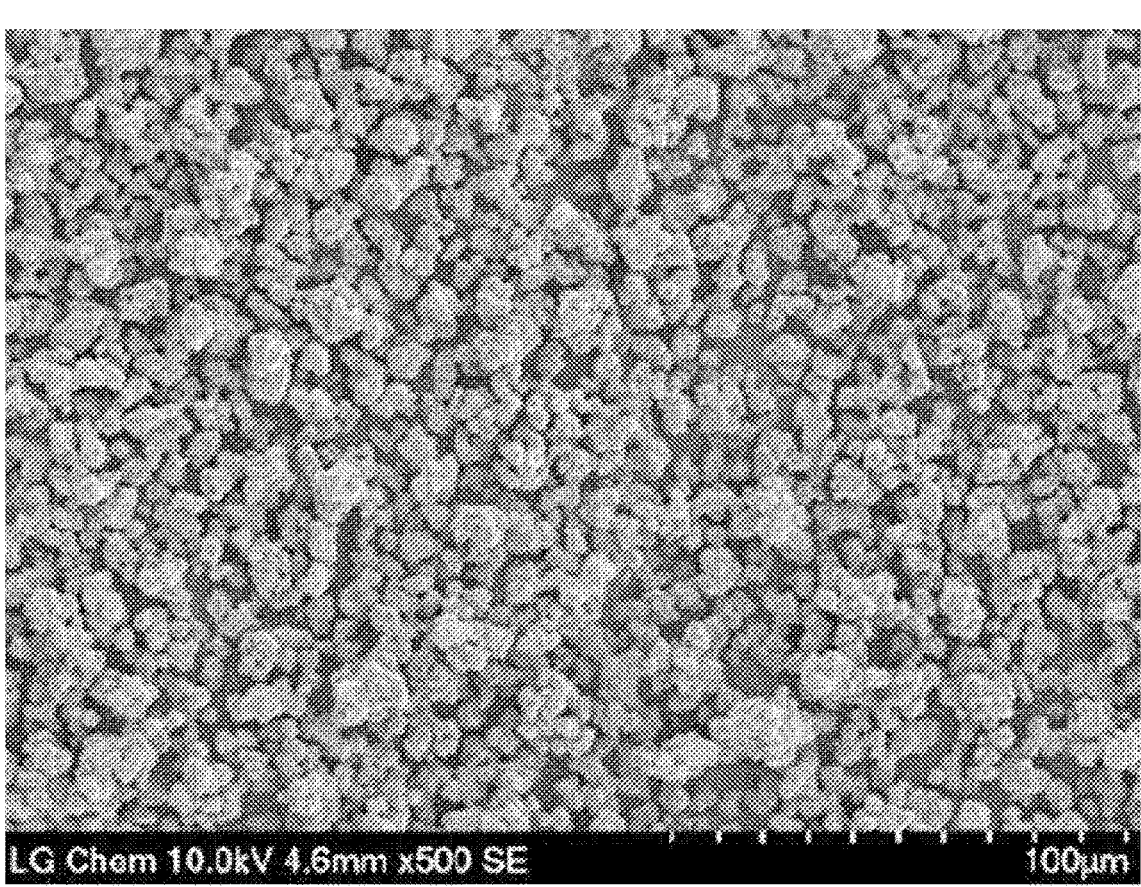

Experimental Example 1: Degree of Disintegration of Positive Electrode Active Material The positive electrode active materials prepared in Example 1 and Comparative Example 1 were coarsely pulverized through a roll mill, and 100 g thereof was input in a hand mixer, and then disintegrated for 2 minutes. Thereafter FIGS. 1 and 2 (Example 1), FIGS. 3 and 4 (Comparative Example 1) were photographs of the disintegrated positive electrode active material, which are observed on an enlarged scale by a scanning electron microscope (SEM).

Referring to FIGS. 1 to 4, both the positive electrode active materials prepared in Example 1 and Comparative Example 1 were single particle-type, however, while Example 1 (FIGS. 1 and 2) showed that the particles using the precursor with the cobalt (Co) shell portion was well disintegrated and not massed, Comparative Example 1 (FIGS. 3 and 4) showed that the particles having no cobalt (Co) shell portion in the precursor are aggregated a lot due to poor disintegration.

Experimental Example 2: Particle Diameter of Primary Particles of Positive Electrode Active Material and Crystallite Size The positive electrode active materials prepared in Example 1 and 2, Comparative Example 1 and 2 were coarsely pulverized through a roll mill, and 100 g thereof was input in a hand mixer, and then disintegrated for 2 minutes. Thereafter an average particle diameter ($D_{50}$) of primary particles of the disintegrated positive electrode active material and crystallite size were measured. The average particle diameter ($D_{50}$) of the primary particles in Example 1 and 2 was measured using a laser diffraction method (Microtrac), the crystallite size was measured using an XRD (Ultima IV), and that value was calculated.

TABLE 1

| | Whether single particle | $D_{50}$ of primary particles after disintegration (μm) | Crystallite size (nm) |
|---|---|---|---|
| Example 1 | 0 | 6.8 | 233 |
| Example 2 | 0 | 6.8 | 233 |
| Comparative Example 1 | 0 | 7.7 | 234 |

Referring to Table 1, although single particles were formed in all of Example 1 and 2, Comparative Example 1, there was a difference in that the positive electrode active material of Example 1 and 2 using the precursor with the cobalt (Co) shell portion had a small $D_{50}$ of less than 7.0 μm after disintegration, while the positive electrode active material of Comparative Example 1 having no cobalt (Co) shell portion in the precursor had a large $D_{50}$ of 7.7 μm after disintegration. In Example 1 and 2 using the precursor with the cobalt (Co) shell portion, a decrease in $D_{50}$ was confirmed due to the high degree of disintegration after disintegration.

Experimental Example 3: Particle Size Distribution after Disintegration by Pressuring The positive electrode active materials prepared in Example 1 and Comparative Example 1 were pressured through a Carver 4350. Specifically, 3 g of the positive electrode active materials prepared in Example 1 and Comparative Example 1 was respectively put into a cylindrical mold, and then the mold including the positive electrode active material were pressured. Thereafter, the particle size of the positive electrode active material which is disintegrated by pressuring were measured using a laser diffraction method (Microtrac), the results are shown in Table 2 and FIG. 5.

TABLE 2

| | Press | $D_{min}$ | $D_{10}$ | $D_{50}$ | $D_{90}$ | $D_{max}$ | $\Delta D_{50}$ |
|---|---|---|---|---|---|---|---|
| Example 1 | — | 2.8 | 4.6 | 6.8 | 10.1 | 22.0 | 1.6 |
| | 2.5 ton | 2.3 | 3.6 | 5.2 | 7.7 | 15.6 | |
| Comparative Example 1 | — | 2.8 | 4.9 | 7.7 | 12.0 | 26.2 | 2.3 |
| | 2.5 ton | 2.0 | 3.5 | 5.4 | 8.2 | 15.6 | |

Figure 5:
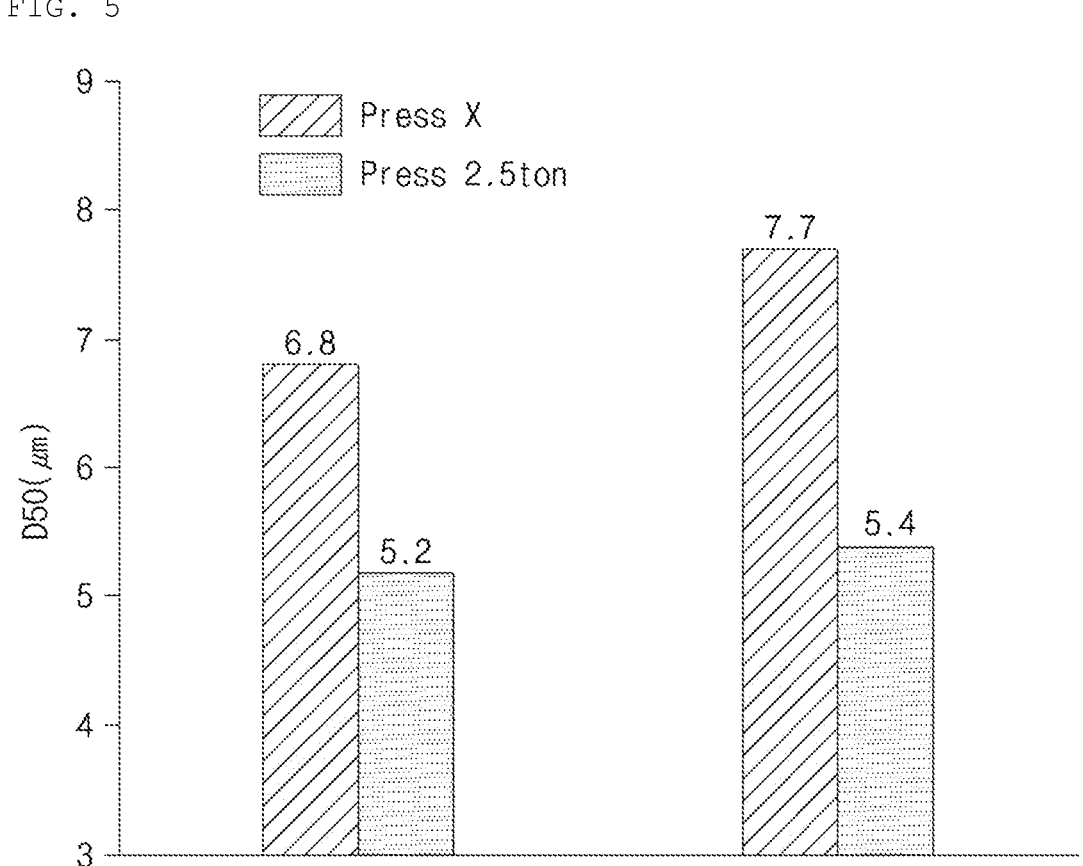
FIG. 5 is a graph which shows the change in size of particles before and after pressuring of the positive electrode active materials prepared in Example 1 and Comparative Example 1.

Referring to Table 2 and FIG. 5, the positive electrode active material of Example 1 using the precursor with the cobalt (Co) shell portion had a small difference of 1.6 between $D_{50}$ after disintegration without pressuring and $D_{50}$ after applying a pressure of 2.5 ton, that is in a state of being disintegrated by pressuring, while the positive electrode active material of Comparative Example 1 having no cobalt (Co) shell portion in the precursor had a large difference of 2.3 in $D_{50}$. When disintegrating without pressuring, it is hereby configured that the degree of disintegration of Comparative Example 1 showed lower than that of Example 1.

Experimental Example 4: Lithium by-Product Measurement 5 g of each of the positive electrode active materials prepared in Example 1 and Comparative Example 1 was dispersed in 100 mL of water and then titrated by 0.1 M HCl, and at the same time, changes in pH value were measured to obtain a pH titration curve. LiOH residue content and $Li_2CO_3$ residue content within each of the positive electrode active material was calculated by using the pH titration curve, and a sum value thereof was evaluated as the total lithium by-product residues content to show in Table 3 below.

TABLE 3

| | Total residual lithium by-products content (wt %) |
|---|---|
| Example 1 | 0.106 |
| Comparative Example 1 | 0.153 |

Referring to Table 3, the positive electrode active material of Example 1 has the lithium by-products content of 0.15 wt % or less, and the lithium by-products content was decreased than the positive electrode active material of Comparative Example 1.

The invention claimed is:

1. A method for preparing a positive electrode active material for a secondary battery, the method comprising:
   providing a positive electrode active material precursor including
      a core portion of nickel-cobalt-manganese hydroxide and
         a shell portion of cobalt hydroxide that surrounds the core portion;
   forming a lithium composite transition metal oxide in a single particle form by mixing the positive electrode active material precursor with a lithium raw material to obtain a mixture, and firing the mixture at a temperature ranging from 980 to 1050° C.,
   wherein the positive electrode active material precursor has a nickel (Ni) content of 60 mol % or less in the total transition metal, and a cobalt (Co) content greater than a manganese (Mn) content, and
   wherein the positive electrode active material precursor includes a core portion consisting of nickel-cobalt-manganese hydroxide and a shell portion consisting of cobalt hydroxide.

2. The method for preparing the positive electrode active material for a secondary battery of claim 1, wherein the core portion is formed by coprecipitating a first transition metal solution including nickel (Ni), cobalt (Co), and manganese (Mn).

3. The method for preparing the positive electrode active material for a secondary battery of claim 1, wherein the shell portion is formed by coprecipitating a second transition metal solution including cobalt (Co).

4. The method for preparing the positive electrode active material for a secondary battery of claim 1, wherein the shell portion has 5 to 30 parts by volume based on 100 parts by volume of the positive electrode active material precursor.

5. The method for preparing the positive electrode active material for a secondary battery of claim 1, wherein the positive electrode active material precursor is in a form of secondary particles in which primary particles are aggregated.

6. The method of claim 5, wherein an average particle diameter ($D_{50}$) of the secondary particles is from 3 μm to 8 μm.

7. The method for preparing the positive electrode active material for a secondary battery of claim 1, wherein the firing is performed so that the positive electrode active material comprises primary particles having an average particle diameter (D50) of 2-10 μm.

8. The method for preparing the positive electrode active material for a secondary battery of claim 1, wherein the firing is performed so that the positive electrode active material includes a crystallite size of 210 nm or more.

9. The method for preparing the positive electrode active material for a secondary battery of claim 1, wherein the lithium raw material is mixed so that a molar ratio (Li/M) of lithium (Li) in the lithium raw material to all metal elements (M) contained in the lithium composite transition metal oxide is 1.06 or less.

10. The method of claim 9, wherein the molar ratio (Li/M) is 1 to 1.06.

11. The method for preparing the positive electrode active material for a secondary battery of claim 1, the method further comprising forming a coating portion by mixing and heat-treating the lithium composite transition metal oxide with a coating raw material including at least one selected from the group consisting of Al, B, Zr, Ti, Mg, Ta, Nb, Mo, W and Cr.

12. The method of claim 1, wherein the cobalt (Co) content is at least 5 mol % greater than the manganese (Mn) content.

13. The method of claim 1, wherein the firing of the mixture consists of a single temperature treatment at a temperature ranging from 980-1050° C.

* * * * *